US012443796B2

(12) United States Patent
Qi et al.

(10) Patent No.: US 12,443,796 B2
(45) Date of Patent: Oct. 14, 2025

(54) OUT OF DOMAIN SENTENCE DETECTION (71) Applicant: INTERNATIONAL BUSINESS MACHINES CORPORATION, Armonk, NY (US)

(72) Inventors: Haode Qi, Cambridge, MA (US); Cheng Qian, Toronto (CA); Ladislav Kunc, Cambridge, MA (US); Saloni Potdar, Arlington, MA (US); Eric Donald Wayne, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 498 days.

(21) Appl. No.: 17/815,630

(22) Filed: Jul. 28, 2022

(65) Prior Publication Data

US 2024/0037331 A1  Feb. 1, 2024

(51) Int. Cl.
  *G06F 40/279* (2020.01)
  *G06F 16/3329* (2025.01)
  *G06F 40/30* (2020.01)

(52) U.S. Cl.
  CPC ........ G06F 40/279 (2020.01); G06F 16/3329 (2019.01); G06F 40/30 (2020.01)

(58) Field of Classification Search
  CPC .... G06F 40/279; G06F 16/3329; G06F 40/30; G06F 16/36
  See application file for complete search history.

(56) References Cited

U.S. PATENT DOCUMENTS

| 10,528,666 B2 | 1/2020 | Min |
| 10,909,442 B1* | 2/2021 | Szarvas ................... G06N 3/08 |
| 11,023,683 B2 | 6/2021 | Padhi et al. |
| 2019/0050395 A1* | 2/2019 | Min ....................... G06N 3/04 |
| 2019/0171929 A1* | 6/2019 | Abadi .................... G06N 3/045 |

(Continued)

OTHER PUBLICATIONS

An et al., "Variational Autoencoder based Anomaly Detection using Reconstruction Probability", http://dm.snu.ac.kr/static/docs/TR/SNUDM-TR-2015-03.pdf, Dec. 27, 2015, pp. 1-18.

(Continued)

*Primary Examiner* — Pierre Louis Desir
*Assistant Examiner* — Cody Douglas Hutcheson
(74) *Attorney, Agent, or Firm* — Amin, Turocy & Watson, LLP (57) ABSTRACT A method, a structure, and a computer system for OOD sentence detection in dialogue systems. The exemplary embodiments may include receiving, for a domain corresponding to a particular topic, one or more on-topic text inputs and one or more off-topic text inputs. The exemplary embodiments may further include encoding the one or more on-topic text inputs and the one or more off-topic text inputs into a latent space, as well as decoding the one or more on-topic text inputs and the one or more off-topic text inputs from the latent space. The exemplary embodiments may additionally include minimizing a reconstruction error between the encoded one or more on-topic text inputs and the decoded one or more on-topic text inputs, and maximizing a reconstruction error between the encoded one or more off-topic text inputs and the decoded one or more off-topic text inputs.

20 Claims, 6 Drawing Sheets (56) References Cited

U.S. PATENT DOCUMENTS

| | | |
|---|---|---|
| 2021/0034965 A1 | 2/2021 | Tan et al. |
| 2022/0230000 A1* | 7/2022 | Jalaluddin ............. G06F 40/295 |
| 2022/0272054 A1* | 8/2022 | Gao ...................... G06F 40/284 |

OTHER PUBLICATIONS

Disclosed Anonymously, "A Method to Identify Non-Contextual Words based on Word Weightage, Domain-Specific Glossary, Dictionary, and Thesaurus," IPCOM000242682D, IP.com, Aug. 4, 2015, pp. 1-8.

IBM Cloud Docs, "Enhanced Irrelevance Detection Update", Release notes for Watson Assistant, Mar. 1, 2022, https://cloud.ibm.com/docs/assistant?topic=assistant-release-notes, accessed Mar. 28, 2022, pp. 1-78.

Liang, et al., "GAN-Based Out-of-Domain Detection Using Both In-Domain and Out-of-Domain Samples," ICASSP 2021-2021 IEEE International Conference on Acoustics, Speech and Signal Processing (ICASSP), IEEE, 2021, pp. 1-5.

Marek et al., "OodGAN: Generative Adversarial Network for Out-of-Domain Data Generation", https://arxiv.org/pdf/2104.02484.pdf, Apr. 6, 2021, pp. 1-8.

Mell et al., "The NIST Definition of Cloud Computing", National Institute of Standards and Technology, Special Publication 800-145, Sep. 2011, pp. 1-7.

Ryu et al., "Neural Sentence Embedding Using only In-Domain Sentences for Out-of-Domain Sentence Detection in Dialog Systems," Pattern Recognition Letters 88 (2017): pp. 1-8.

Zheng et al., "Out-of-domain Detection for Natural Language Understanding in Dialog Systems", https://arxiv.org/pdf/1909.03862.pdf, Mar. 22, 2020, pp. 1-12.

* cited by examiner

OUT OF DOMAIN SENTENCE DETECTION

BACKGROUND

The exemplary embodiments relate generally to dialogue systems, and more particularly to improving out of domain sentence detection in dialogue systems.

Dialog systems are one of the most popular cloud AI services, and intent detection is a key component of modern task-oriented dialog systems. Dialogue systems are often trained for expertise within a particular topic, or domain, and may receive a query outside of the domain in which it is trained. In these situations, the dialogue system may provide an undesirable user experience.

SUMMARY

The exemplary embodiments disclose a method, a structure, and a computer system for OOD sentence detection within dialogue systems. The exemplary embodiments may include receiving, for a domain corresponding to a particular topic, one or more on-topic text inputs and one or more off-topic text inputs. The exemplary embodiments may further include encoding the one or more on-topic text inputs and the one or more off-topic text inputs into a latent space, as well as decoding the one or more on-topic text inputs and the one or more off-topic text inputs from the latent space. The exemplary embodiments may additionally include minimizing a reconstruction error between the encoded one or more on-topic text inputs and the decoded one or more on-topic text inputs, and maximizing a reconstruction error between the encoded one or more off-topic text inputs and the decoded one or more off-topic text inputs.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Dialog systems are one of the most popular cloud AI services, and intent detection is a key component of modern task-oriented dialog systems. Dialogue systems are often trained for expertise within a particular topic, or domain, and may receive a query outside of the domain (OOD) in which it is trained. In these situations where an OOD query is received, the dialogue system may provide an undesirable user experience.

The problems presented with addressing OOD, or off-topic, queries are multifield. OOD data, for example, is generally received less frequently and neglected in the training of a task-oriented, in-domain dialogue system, making it harder to collect and find. Moreover, received OOD data may be broad in that it may not be restricted to any domain, and incorporating too few or too many OOD examples may cause severe data imbalance for supervised OOD detection algorithm. Therefore, not only is OOD data scarce, but additionally broad, making the capture of a broad out of domain distribution very difficult by the limited OOD data currently collected.

The proposed invention addresses the challenge of effectively utilizing the limited amount of out of domain training examples provided in an unsupervised manner. This approach can also be in an ensemble of other OOD detection algorithms to further enhance the performance. In particular, the present inventive concept trains autoencoders to maximize the reconstruction loss for OOD examples and at the same time to minimize the reconstruction loss for in-domain examples. This approach may, e.g., mask OOD examples with a negative factor. By learning with OOD examples, it in return helps to better reconstruct in domain examples.

Figure 1:
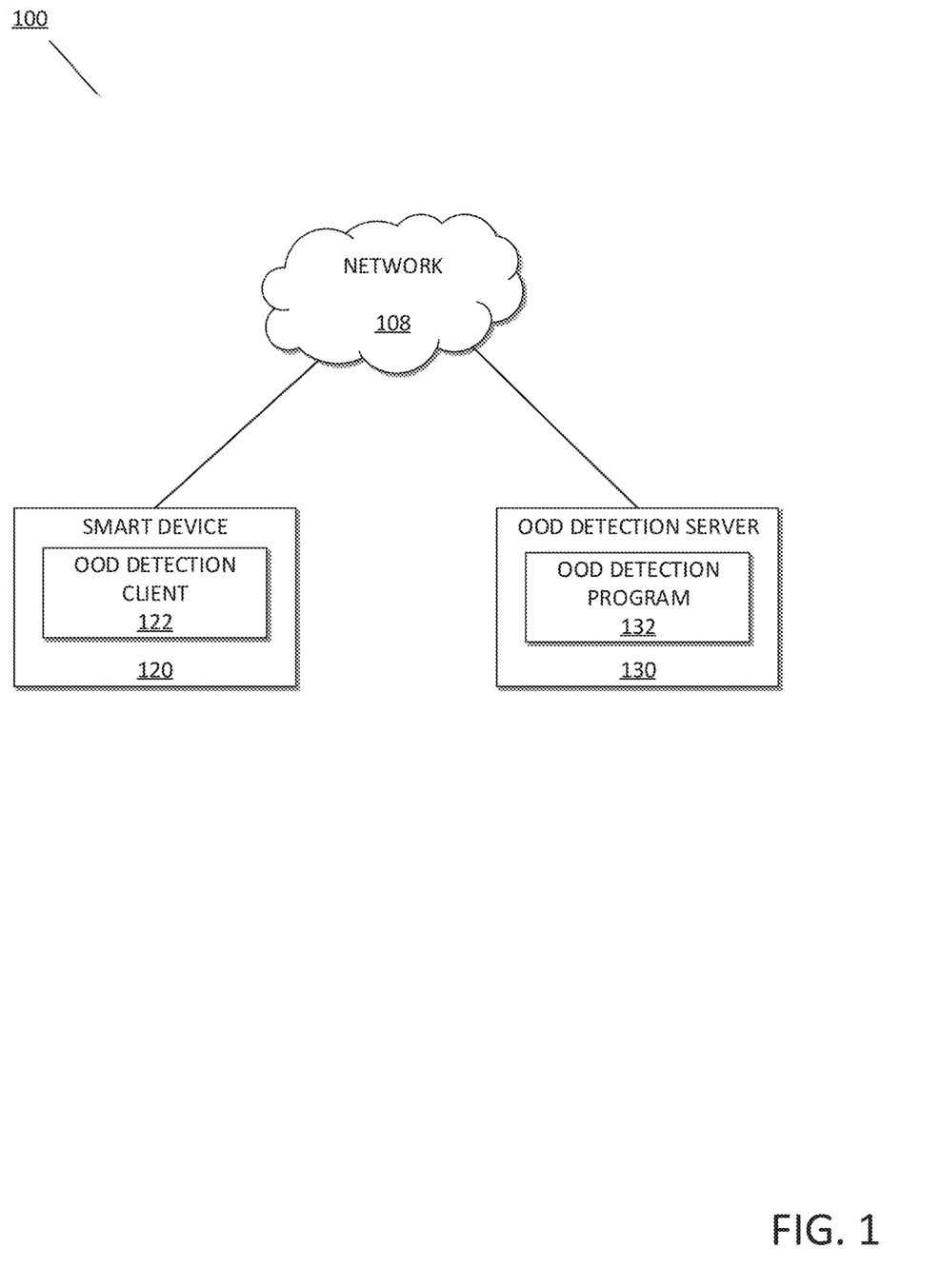
FIG. 1 depicts an exemplary schematic diagram of an OOD detection system 100, in accordance with the exemplary embodiments.

FIG. 1 depicts the OOD detection system 100, in accordance with exemplary embodiments. According to the exemplary embodiments, the OOD detection system 100 may include a smart device 120 and an OOD detection server 130, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted. The operations of the OOD detection system 100 are described in greater detail herein.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), a combination thereof, etc. In further embodiments, the network 108 may be a Bluetooth network, a Wi-Fi network, a combination thereof, etc. The network 108 may operate in frequencies including 2.4 gHz and 5 gHz internet, near-field communication, etc. In yet further embodiments, the network 108 may be a telecommunications network used to facilitate telephone calls between two or more parties comprising a landline network, a wireless network, a closed network, a satellite network, a combination thereof, etc. In general, the network 108 may represent any combination of connections and protocols that will support communications between connected devices.

In exemplary embodiments, the smart device 120 includes an OOD detection client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The OOD detection client 122 may act as a client in a client-server relationship, e.g., with the OOD detection server 130, and may be a software and/or hardware application capable of communicating with and providing a user interface for a user to interact with the OOD detection server 130 and other computing devices via the network 108. Moreover, the OOD detection client 122 may be further capable of transferring data from the smart device 120 to and from other devices via the network 108. In particular, the OOD detection client 122 may allow for dialogue in the form of text, speech, gesture, etc. between a user and a dialogue system. In embodiments, the OOD detection client 122 may utilize various wired and wireless connection protocols for data transmission and exchange, including Bluetooth, 2.4 gHz and 5 gHz internet, near-field communication (NFC), etc. The OOD detection client 122 is described in greater detail with respect to FIG. 2-6.

In exemplary embodiments, the OOD detection server 130 includes an OOD detection program 132, and may act as a server in a client-server relationship with the OOD detection client 122. The OOD detection server 130 may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the OOD detection server 130 is shown as a single device, in other embodiments, the OOD detection server 130 may be comprised of a cluster or plurality of computing devices, in a modular manner, etc., working together or working independently. The OOD detection server 130 is described in greater detail as a hardware implementation with reference to FIG. 4, as part of a cloud implementation with reference to FIG. 5, and/or as utilizing functional abstraction layers for processing with reference to FIG. 6.

The OOD detection program 132 may be a software and/or hardware program that may receive on- and off-topic inputs and encode the on- and off-topic inputs. The OOD detection program 132 may further decode the encoded on- and off-topic inputs. In addition, the OOD detection program 132 may maximize a reconstruction loss of the off-topic inputs and minimize a reconstruction loss of the on-topic inputs. Lastly, the OOD detection program 132 may identify off-topic inputs. The OOD detection program 132 is described in greater detail with reference to FIG. 2-6.

Figure 2:
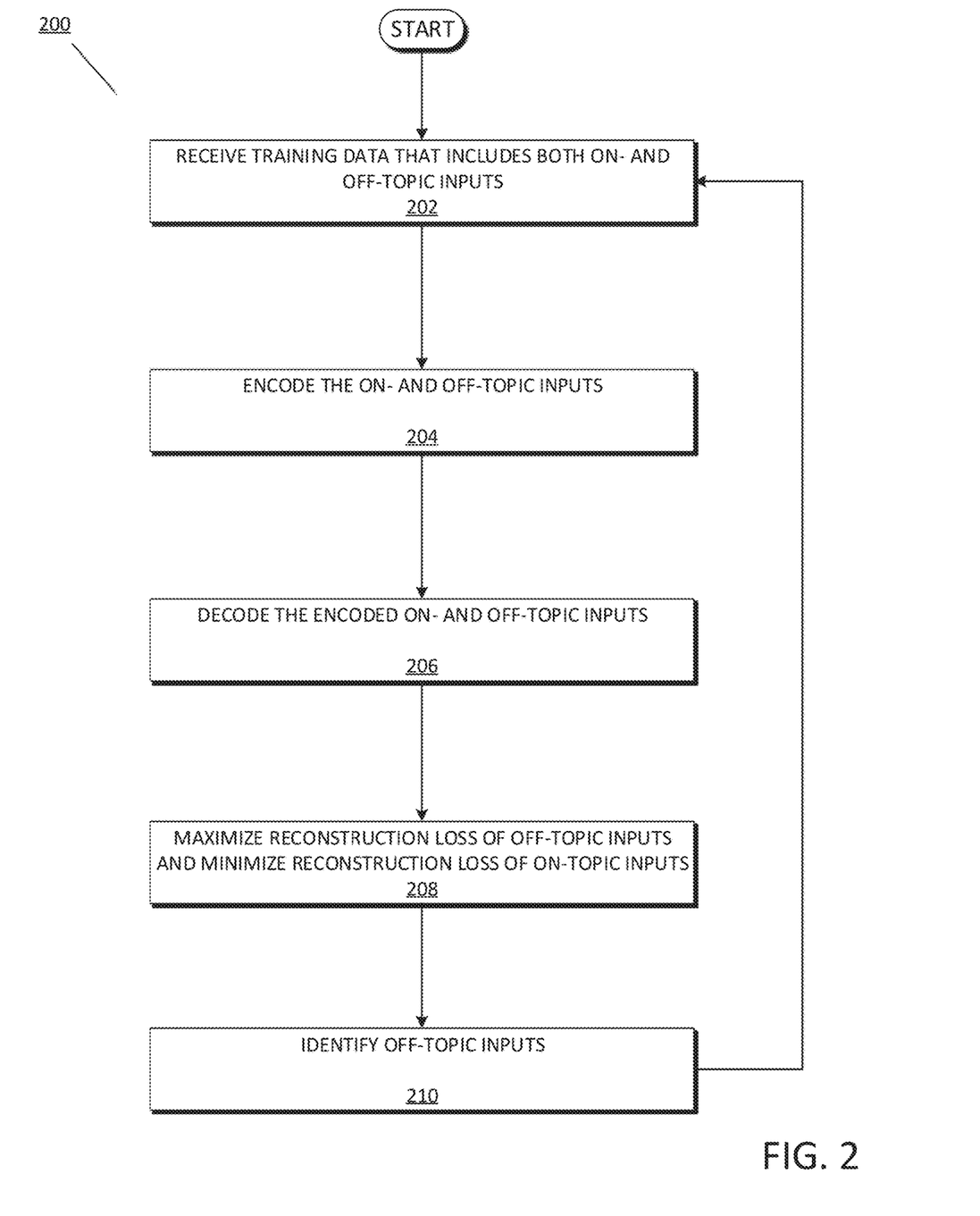
FIG. 2 depicts an exemplary flowchart 200 illustrating an OOD detection program 132 of the OOD detection system 100, in accordance with the exemplary embodiments.

FIG. 2 depicts an exemplary flowchart 200 illustrating the operations of the OOD detection program 132 of the OOD detection system 100, in accordance with the exemplary embodiments. The OOD detection program 132 may be used to improve the handling of OOD sentences within a dialogue system that is trained for a particular domain, or topic. In embodiments, it is desirable for reasons such as size, efficiency, etc. to pre-configure dialogue systems for expertise in specific domains, e.g., a separate chatbot for each of bill pay, returns, account, etc., rather than a single chatbot expert for all domains, which is impractical if not impossible. As a result, any single- or multi-domain dialogue system may receive both in-domain (on-topic) input from a user, as well as out of domain (OOD) (off-topic) input from a user while in dialogue. While these dialogues systems are trained to excel at in-domain dialogue, they struggle handling out-of-domain inputs. The OOD detection program 132 may achieve improved handling of these OOD sentences by training the dialogue system with the addition of off-topic counter-examples, as is described in greater detail herein.

The OOD detection program 132 may receive training data that includes both on- and off-topic inputs (step 202). Generally, the OOD detection program 132 may be trained for user dialogue with respect to a particular domain, and during this training the OOD detection program 132 may receive training data. The training data may mimic user dialogue and include words and/or sentences in speech, text, gesture, etc. For example, the OOD detection program 132 may be configured to capture gestures using integrated cameras in conjunction with body movement analysis. The training data may be labelled based on domain, and may be received via user input from an authorized party (e.g., administrator of the dialogue system), extracted from a database, etc. Typically, this training data for dialogue systems includes only on-topic training data in order to improve handling of inputs relevant to the intended domain. Here, however, the training data includes both on-topic inputs and off-topic inputs with respect to a particular domain. The off-topic inputs may ask questions outside of a domain for which the dialogue system is trained. Such off-topic inputs may, for example, ask a question the dialogue system is not trained to answer, reference a topic the dialogue system is not educated on, etc. Like traditional training data, the OOD detection program 132 may receive off-topic inputs via user input, reference to a database, etc.

In order to better illustrate the operations of the OOD detection program 132, reference is now made to an illustrative example wherein the OOD detection program 132 is tasked with improving OOD sentence detection of a automated dialogue system for processing returns. Accordingly, the OOD detection program 132 receives from an administrator examples of dialogue sentences that are within the domain of returns, such as those relating to return windows and reasons for returning an item. In addition, the OOD detection program 132 receives from the administrator counter-examples of dialogue sentences outside the domain of returns, such as pricing options and product availability.

The OOD detection program 132 may encode the on-topic inputs and the off-topic inputs (step 204). In embodiments, the OOD detection program 132 may first encode the on- and off-topic inputs using a sentence encoder, for example a universal sentence encoder, into a numerical vector representation. The numerical vector representation is a means to represent an actual sentence with a vector of numbers for machine learning models to consume. The OOD detection program 132 may then encode the numerical vector representation into a latent space using an autoencoder, or a type of artificial neural network used to learn efficient codings of unlabelled data. The OOD detection program 132 may use various encoders, such as regularized, concrete, or variational autoencoders, and the autoencoders may perform tasks such as dimensionality reduction, information retrieval, anomaly detection, image processing, etc.

Furthering the illustrative example introduced above, the OOD detection program 132 encodes the inputs both related to and unrelated to returns using an autoencoder.

The OOD detection program 132 may decode the encoded on- and off-topic inputs (step 206). In embodiments, the OOD detection program 132 decodes the encoded on- and off-topic inputs as part of training the autoencoder, and may do so by projecting the latent space representation back to the original vector space in an attempt to reconstruct the original numerical vector representations. As will be described in greater detail below, the input to the autoencoder (numerical vector representation) is compared to the decoded output of the autoencoder. In the case of on-topic examples, the OOD detection program 132 may minimize the reconstruction error (between the input vs. output); in case of off-topic examples, the OOD detection program 132 may maximize it. With this logic, the OOD detection program 132 may optimize for the parameters of the autoencoder. At runtime, the OOD detection program 132 may feed a vector representation of input received from a user in real time into the trained autoencoder, and calculate the reconstruction error measuring how confident the OOD detection program 132 thinks the input sentence is off-topic, as will be described in greater detail below.

In the aforementioned example, the OOD detection program 132 decodes the encoded on- and off-topic inputs to reconstruct the numerical vector representations.

The OOD detection program 132 may maximize a reconstruction loss of the off-topic inputs and minimize a reconstruction loss of the on-topic inputs (step 208). During the training of the autoencoder, i.e., encoding and decoding the on- and off-topic inputs, the OOD detection program 132 may assign a positive factor for the loss function of on-topic example inputs and a negative factor for the loss function of off-topic counter-example inputs, thereby minimizing the reconstruction error of on-topic inputs and maximizing the reconstruction error of off-topic inputs. The loss function may be, e.g., cosine similarity, however any suitable loss function may be implemented. Incorporating counter-examples in autoencoder training not only helps identify out-of-domain examples, but additionally improves confidence of handling in-domain examples. Moreover, a masking approach can extend this framework with all distance measures in autoencoder training in that operation of the OOD detection program 132 does not depend on the choice of distance metric as long as it's a valid distance metric in vector space (such as cosine similarity or Euclidean distance). Moreover, the masking approach can be extended to have different weighting for each sample by adjusting the factor in the mask. For example, the loss function can be formulated as a mask multiplied by distance_metric(input, reconstructed output), where the mask is positive if input is on-topic and negative for off-topic ones. A common choice of mask would be +1 for on-topic examples and −1 for off-topic examples. For more important on-topic examples, mask can be for example +2, so that it has a higher impact on the autoencoder training. In embodiments, training of the OOD detection program 132, and in particular the autoencoder, may be considered complete once satisfactory performance is achieved, e.g., a sufficient accuracy of OOD dialogue detection is achieved. Following the training phase, the OOD detection program 132 may be implemented in chat dialogue in order to identify and improve the handling of OOD dialogue in real-time.

With reference to the aforementioned example, the OOD detection program 132 trains the autoencoder to minimize a reconstruction error of the on-topic inputs while maximizing the reconstruction error of off-topic inputs.

The OOD detection program 132 may identify off-topic inputs (step 210). At runtime during dialogue with a user, the OOD detection program 132 may feed user input into the trained autoencoder in order to calculate a reconstruction error of the input. In embodiments, the greater the reconstruction error, the greater the likelihood that a user input is off-topic. This determination may then be used to ask follow-up questions or direct a user to an appropriate dialogue system.

Concluding the aforementioned example, the OOD detection program 132 configured for returns identifies a real-time user query relating to product availability as out-of-domain, or off-topic, based on an increased reconstruction error.

Figure 3:
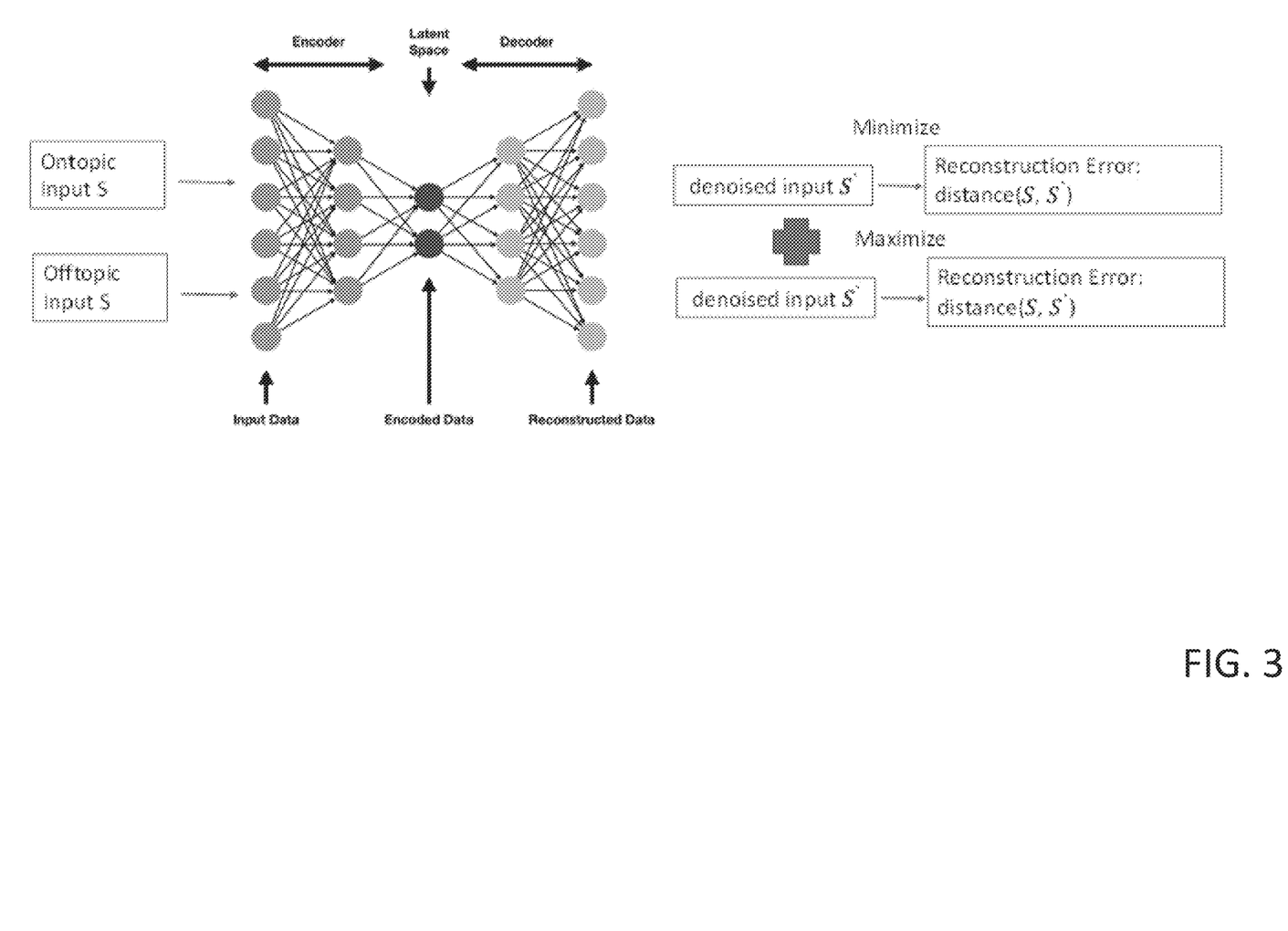
FIG. 3 depicts a visual illustration of the OOD detection program 132, in accordance with exemplary embodiments.

FIG. 3 depicts a visual illustration of the OOD detection program 132, in accordance with exemplary embodiments.

Figure 4:
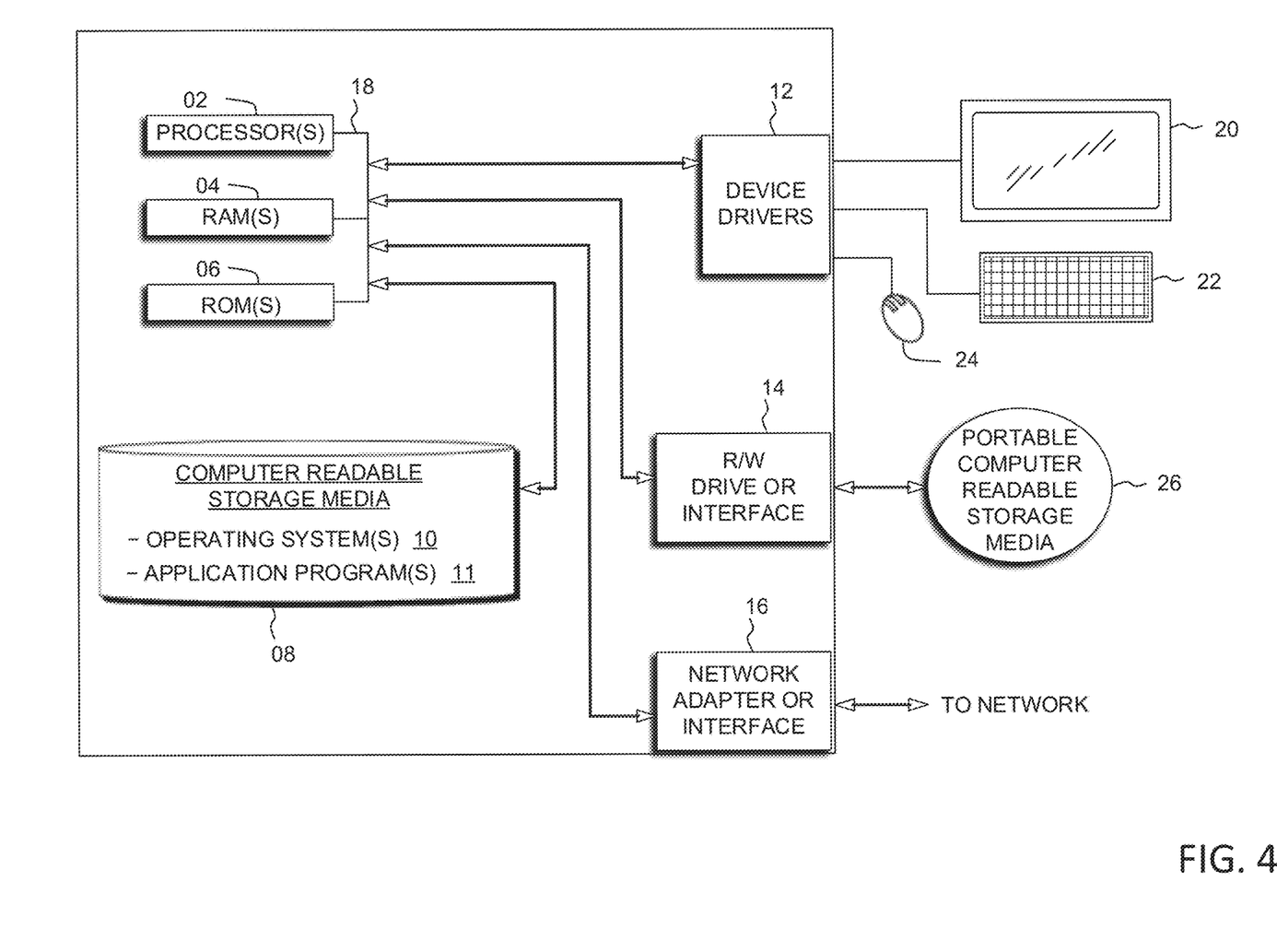
FIG. 4 depicts an exemplary block diagram depicting the hardware components of the OOD detection system 100 of FIG. 1, in accordance with the exemplary embodiments.

FIG. 4 depicts a block diagram of devices used within the OOD detection system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 14 to read from and write to one or more portable computer readable storage media 26. Application programs 11 on said devices may be stored on one or more of the portable computer readable storage media 26, read via the respective RAY drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
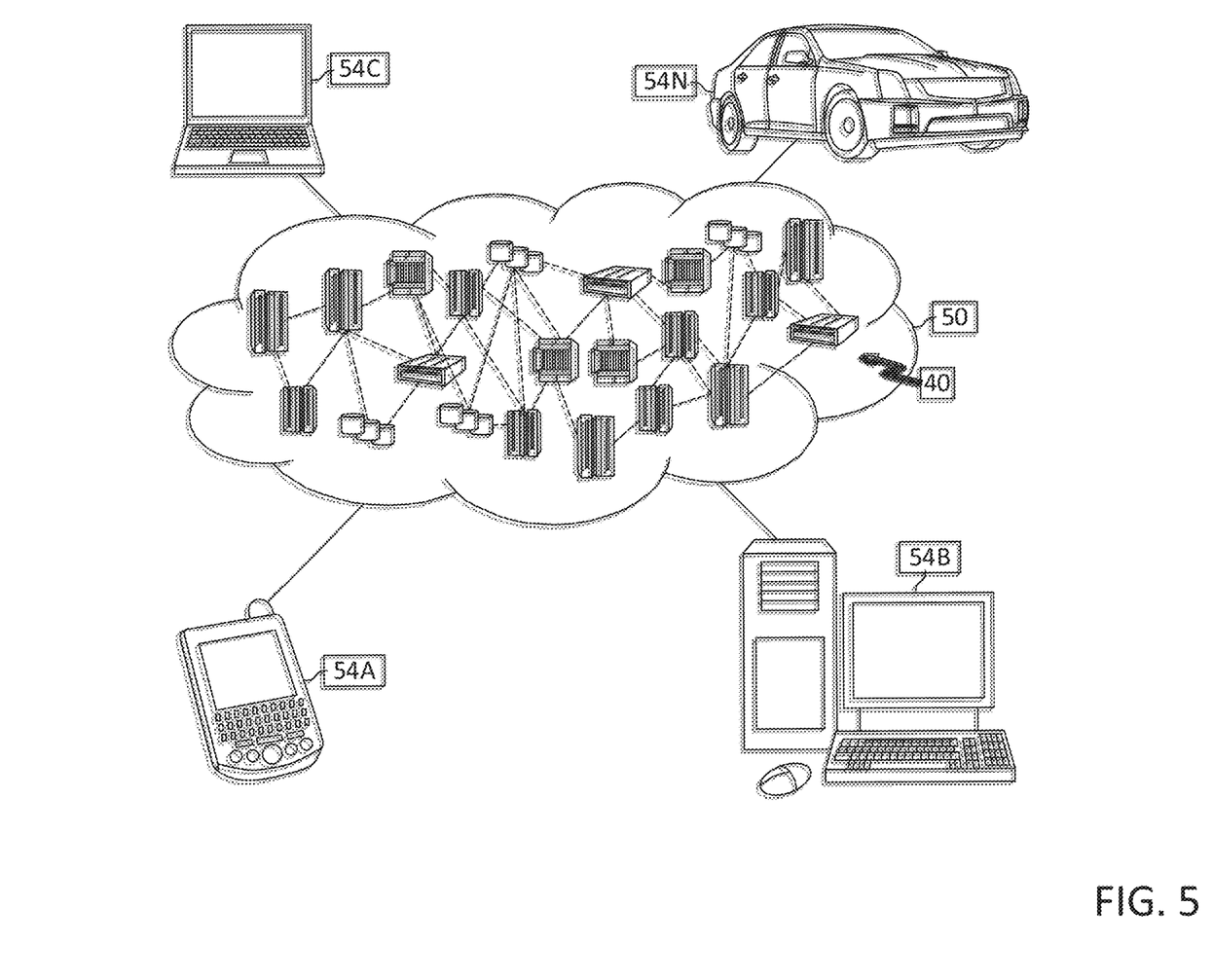
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
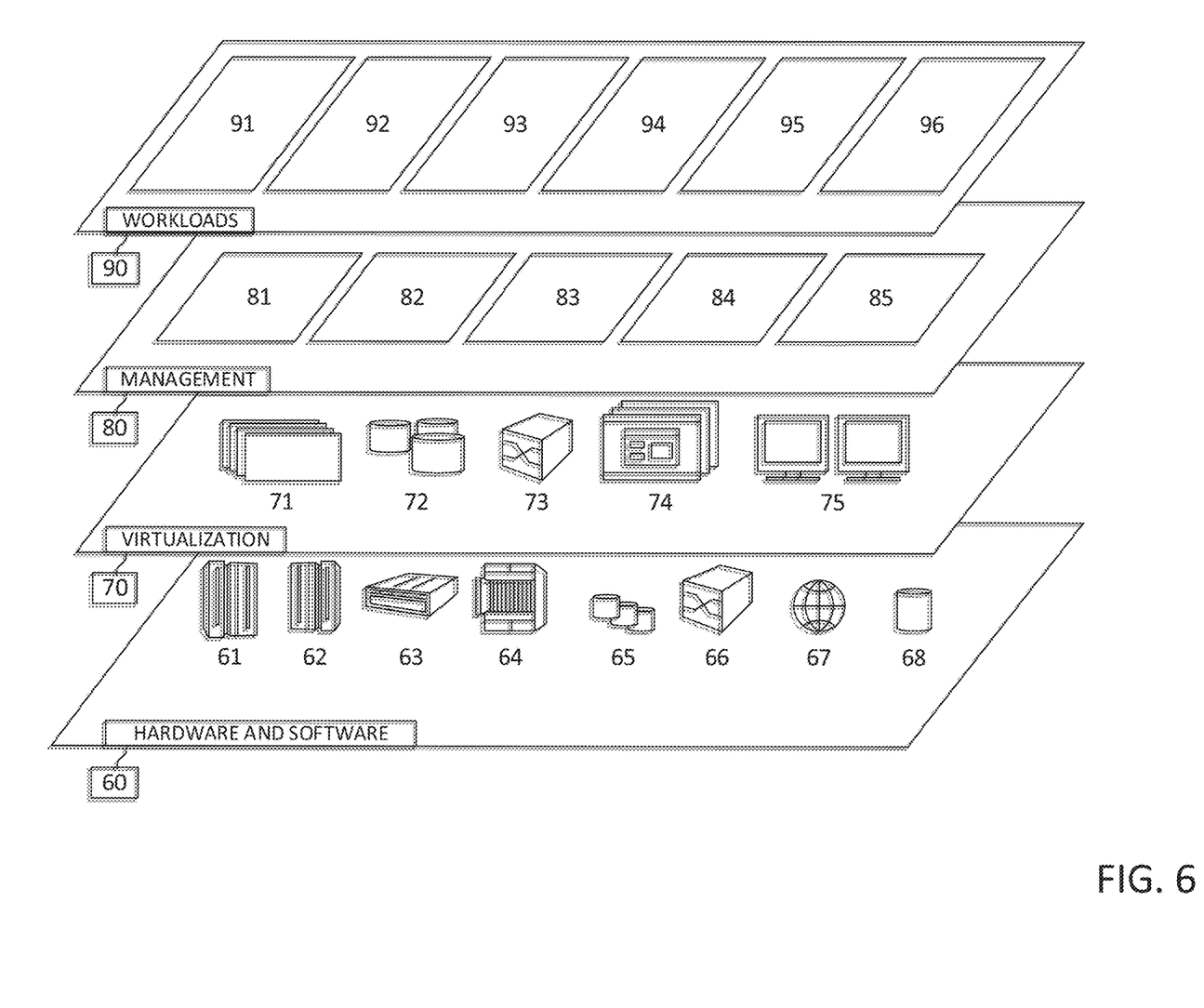
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and out-of-domain dialogue processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:
1. A computer-implemented method, comprising:
 training, by at least one processor of a device, an autoencoder to detect user inputs that are out of a domain in which a dialogue system has been trained, wherein the training comprises:
  receiving, for the domain of the dialogue system, training user input representations, wherein the training user input representations comprise respective weights based on respective importance of the training user input representations to the training, and wherein the training user input representations comprise in-domain training user input representations and out-of-domain training user input representations;
  encoding the in-domain training user input representations into encoded in-domain training user input representations and the out-of-domain training user input representations into encoded out-of-domain training user input representations in a latent space;
  decoding, from the latent space, the encoded in-domain training user input representations into decoded in-domain training user input representations and the encoded out-of-domain training user input representations into decoded out-of-domain training user input representations;
  minimizing an in-domain reconstruction error between the in-domain training user input representations and the decoded in-domain training user input representations respectively corresponding to the in-domain training user input representations, wherein the in- domain reconstruction error is based on the respective weights of the in-domain training user input representations; and maximizing an out-of-domain reconstruction error between the out-of-domain training user input representations and the decoded out-of-domain training user input representations respectively corresponding to the out-of-domain training user input representations, wherein the out-of-domain reconstruction error is based on the respective weights of the out-of-domain training user input representations;

receiving, by the at least one processor, using the dialogue system, a user input from a user;

determining, by the at least one processor, using the autoencoder, whether the user input is out of the domain; and responsive to determining that the user input is out of the domain, directing the user to a different dialogue system trained for another domain that is different from the domain.

2. The computer-implemented method of claim 1, wherein the encoding the in-domain training user input representations and the out-of-domain training user input representations into the latent space comprises:

converting, using at least one sentence encoder, the in-domain training user input representations into respective in-domain vectors;

converting, using the at least one sentence encoder, the out-of-domain training user input representations into respective out-of-domain vectors;

encoding, using the autoencoder, the respective in-domain vectors into respective in-domain latent inputs within the latent space; and encoding, using the autoencoder, the respective out-of-domain vectors into one or more on topic latent inputs and one or more off topic respective out-of-domain latent inputs within the latent space.

3. The computer-implemented method of claim 2, wherein the decoding the encoded in-domain training user input representations and the encoded out-of-domain training user input representations from the latent space comprises:

decoding, using the autoencoder, the respective in-domain latent inputs into the decoded in-domain training user input representations; and decoding, using the autoencoder, the respective out-of-domain latent inputs into the decoded out-of-domain training user input representations.

4. The computer-implemented method of claim 1, wherein the minimizing the in-domain reconstruction error comprises:

assigning a positive factor for a loss function between the encoded in-domain training user input representations and the decoded in-domain training user input representations.

5. The computer-implemented method of claim 1, wherein the maximizing the out-of-domain reconstruction error comprises:

assigning a negative factor for a loss function between the encoded out-of-domain training user input representations and the decoded out-of-domain training user input representations.

6. The computer-implemented method of claim 1, further comprising:

utilizing the in-domain reconstruction error and the out-of-domain reconstruction error as an indicator as to whether a user dialogue comprising the user input is in-domain or out-of-domain.

7. The computer-implemented method of claim 1, wherein the training user input representations comprise previous user-provided inputs of the dialogue system.

8. A computer program product comprising a non-transitory computer-readable medium having instructions stored thereon that, in response to execution, cause a processor to perform operations comprising:

training an autoencoder to detect user inputs that are out of a domain in which a dialogue system has been trained, wherein the training comprises:

receiving, for the domain of the dialogue system, training user input representations, wherein the training user input representations comprise respective weights based on respective importance of the training user input representations to the training, and wherein the training user input representations comprise in-domain training user input representations and out-of-domain training user input representations;

encoding the in-domain training user input representations into encoded in-domain training user input representations and the out-of-domain training user input representations into encoded out-of-domain training user input representations in a latent space;

decoding, from the latent space, the encoded in-domain training user input representations into decoded in-domain training user input representations and the encoded out-of-domain training user input representations into decoded out-of-domain training user input representations;

minimizing an in-domain reconstruction error between the in-domain training user input representations and the decoded in-domain training user input representations respectively corresponding to the in-domain training user input representations, wherein the in-domain reconstruction error is based on the respective weights of the in-domain training user input representations; and maximizing an out-of-domain reconstruction error between the out-of-domain training user input representations and the decoded out-of-domain training user input representations respectively corresponding to the out-of-domain training user input representations, wherein the out-of-domain reconstruction error is based on the respective weights of the out-of-domain training user input representations;

receiving, using the dialogue system, a user input from a user;

determining, using the autoencoder, whether the user input is out of the domain; and responsive to determining that the user input is out of the domain, directing the user to a different dialogue system trained for another domain that is different from the domain.

9. The computer program product of claim 8, wherein the encoding the in-domain training user input representations and the out-of-domain training user input representations into the latent space comprises:

converting, using at least one sentence encoder, the in-domain training user input representations into respective in-domain vectors;

converting, using the at least one sentence encoder, the out-of-domain training user input representations into respective out-of-domain vectors;

encoding, using the autoencoder, the respective in-domain vectors into respective in-domain latent inputs within the latent space; and encoding, using the autoencoder, the respective out-of-domain vectors into respective out-of-domain latent inputs within the latent space.

10. The computer program product of claim 9, wherein the decoding the encoded in-domain training user input representations and the encoded out-of-domain training user input representations from the latent space comprises:

decoding, using the autoencoder, the respective in-domain latent inputs into the decoded in-domain training user input representations; and decoding, using the autoencoder, the respective out-of-domain latent inputs into the decoded out-of-domain training user input representations.

11. The computer program product of claim 8, wherein the minimizing the in-domain reconstruction error comprises:

assigning a positive factor for a loss function between the encoded in-domain training user input representations and the decoded in-domain training user input representations.

12. The computer program product of claim 8, wherein the maximizing the out-of-domain reconstruction error comprises:

assigning a negative factor for a loss function between the encoded out-of-domain training user input representations and the decoded out-of-domain training user input representations.

13. The computer program product of claim 8, further comprising:

utilizing the in-domain reconstruction error and the out-of-domain reconstruction error as an indicator as to whether a user dialogue comprising the user input is in-domain or out-of-domain.

14. The computer program product of claim 8, wherein the training user input representations comprise previous user-provided inputs of the dialogue system.

15. A system, comprising:

a memory configured to store computer executable instructions; and a processor configured to execute at least one of the computer executable instructions that:

trains an autoencoder to detect user inputs that are out of a domain in which a dialogue system has been trained, wherein the training comprises:

receiving, for the domain of the dialogue system, training user input representations, wherein the training user input representations comprise respective weights based on respective importance of the training user input representations to the training, and wherein the training user input representations comprise in-domain training user input representations and out-of-domain training user input representations;

encoding the in-domain training user input representations into encoded in-domain training user input representations and the out-of-domain training user input representations into encoded out-of-domain training user input representations in a latent space;

decoding, from the latent space, the encoded in-domain training user input representations into decoded in-domain training user input representations and the encoded out-of-domain training user input representations into decoded out-of-domain training user input representations;

minimizing an in-domain reconstruction error between the in-domain training user input representations and the decoded in-domain training user input representations respectively corresponding to the in-domain training user input representations, wherein the in-domain reconstruction error is based on the respective weights of the in-domain training user input representations; and maximizing an out-of-domain reconstruction error between the out-of-domain training user input representations and the decoded out-of-domain training user input representations respectively corresponding to the out-of-domain training user input representations, wherein the out-of-domain reconstruction error is based on the respective weights of the out-of-domain training user input representations;

receives, using the dialogue system, a user input from a user;

determines, using the autoencoder, whether the user input is out of the domain; and responsive to determining that the user input is out of the domain, directs the user to a different dialogue system trained for another domain that is different from the domain.

16. The system of claim 15, wherein the encoding the in-domain training user input representations and the out-of-domain training user input representations into the latent space comprises:

converting, using at least one sentence encoder, the in-domain training user input representations into respective in-domain vectors;

converting, using the at least one sentence encoder, the out-of-domain training user input representations into respective out-of-domain vectors;

encoding, using the autoencoder, the respective in-domain vectors into respective in-domain latent inputs within the latent space; and encoding, using the autoencoder, the respective out-of-domain vectors into respective out-of-domain latent inputs within the latent space.

17. The system of claim 16, wherein the decoding the encoded in-domain training user input representations and the encoded out-of-domain training user input representations from the latent space comprises:

decoding, using the autoencoder, the respective in-domain latent inputs into the decoded in-domain training user input representations; and decoding, using the autoencoder, the respective out-of-domain latent inputs into the decoded out-of-domain training user input representations.

18. The system of claim 15, wherein the minimizing the in-domain reconstruction error comprises:

assigning a positive factor for a loss function between the encoded in-domain training user input representations and the decoded in-domain training user input representations.

19. The system of claim 15, wherein the maximizing the out-of-domain reconstruction error comprises:

assigning a negative factor for a loss function between the encoded out-of-domain training user input representations and the decoded out-of-domain training user input representations.

20. The system of claim 15, further comprising:

utilizing the in-domain reconstruction error and the out-of-domain reconstruction error as an indicator as to whether a user dialogue comprising the user input is in-domain or out-of-domain.

\* \* \* \* \*